UNITED STATES PATENT OFFICE.

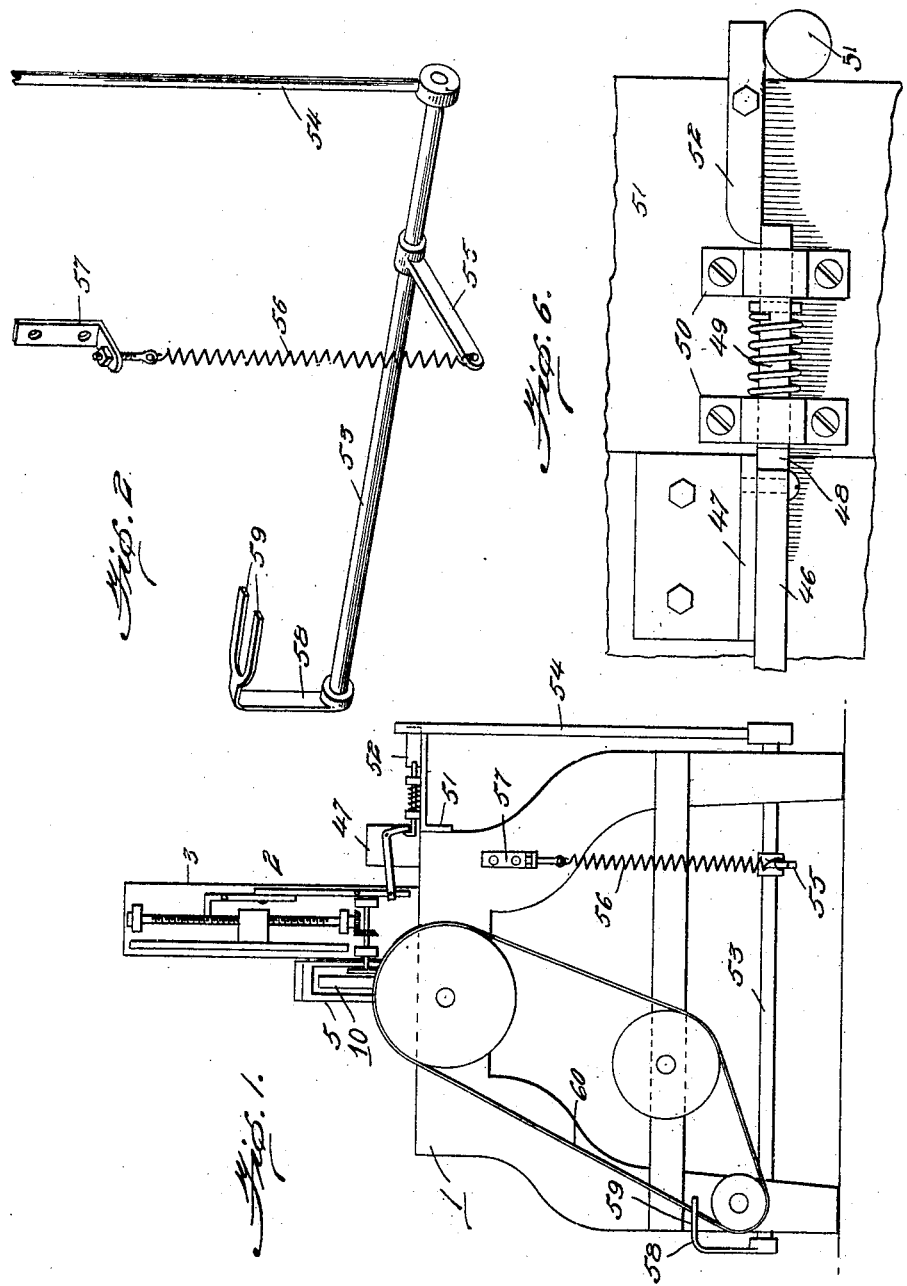

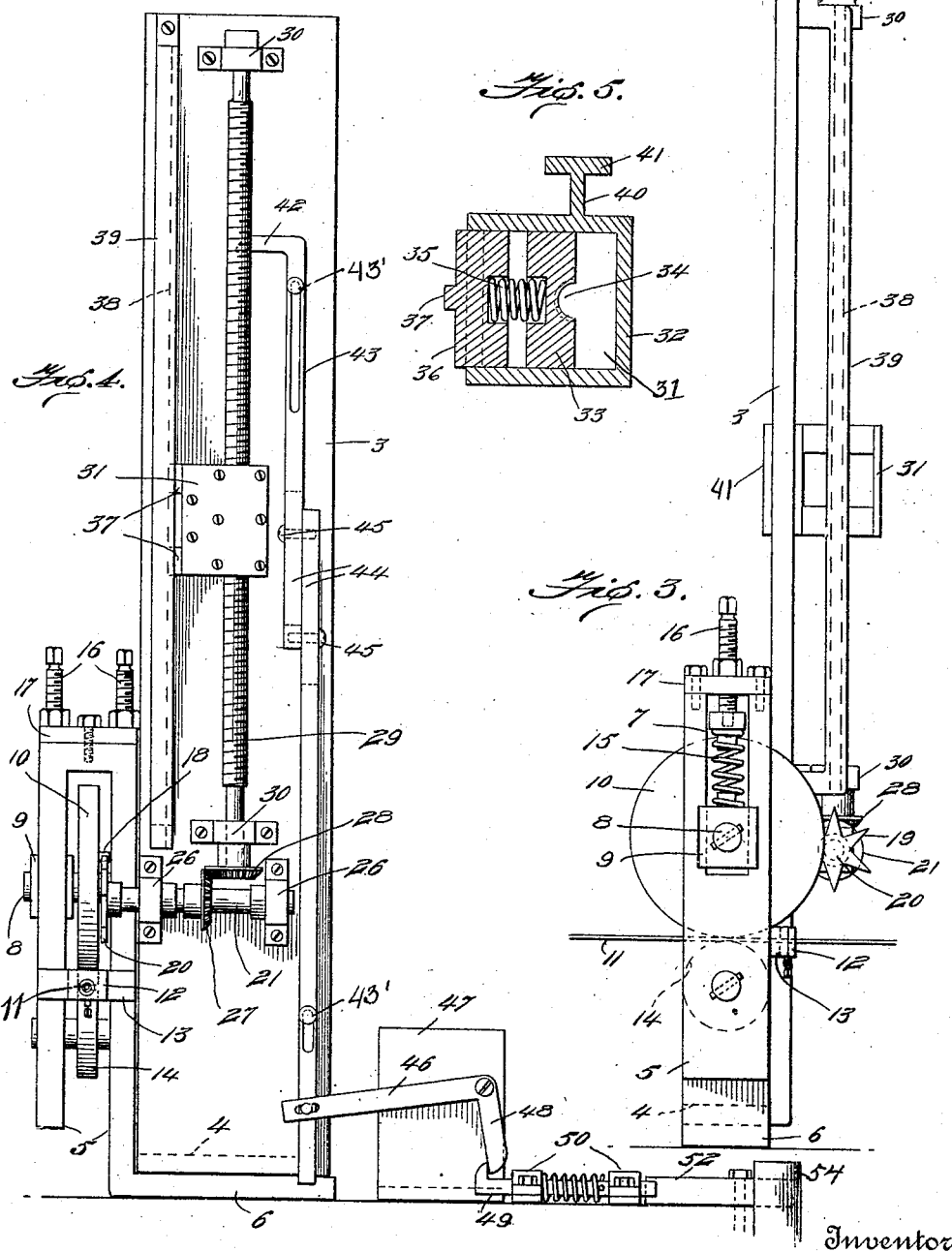

ISAAC ANDREW RYAN, OF IRONTON, OHIO.

AUTOMATIC MEASURING AND STOP MECHANISM FOR WIRE AND CABLE MACHINES.

No. 912,176.  Specification of Letters Patent.  Patented Feb. 9, 1909.

Application filed June 11, 1908. Serial No. 438,000.

*To all whom it may concern:*

Be it known that I, ISAAC ANDREW RYAN, a citizen of the United States, residing at Ironton, in the county of Lawrence and State of Ohio, have invented certain new and useful Improvements in Automatic Measuring and Stop Mechanism for Wire and Cable Machines; and I do declare the following to be a full, clear, and exact description of the invention, such as will enable others skilled in the art to which it appertains to make and use the same.

This invention relates to automatic measuring and stop mechanism for wire and cable machines, and has for its object the production of a simple and efficiently operating device of this kind, whereby the wire or cable machine may be automatically thrown out of operation after a certain amount of wire has been fed thereto.

A further object of the invention is to so construct the device that it may be regulated to throw the wire or cable machine out of gear after any desired amount of wire has been fed thereto.

With these and other objects in view, the invention consists of certain novel features of construction, combination and arrangement of parts, as will be more fully described and particularly pointed out in the appended claims.

In the accompanying drawings, Figure 1 is a diagrammatic view illustrating the application of the invention to the machine; Fig. 2 is a detail perspective view on an enlarged scale of the belt shifting mechanism; Fig. 3 is an edge elevation of the improved measuring and stop mechanism; Fig. 4 is a front elevation thereof; and Fig. 5 is a horizontal section taken through the slide for actuating the trip device; Fig. 6 is a fragmentary plan view on an enlarged scale of a controlling device for the belt shifter.

In the embodiment illustrated, the numeral 1 indicates the frame work of a wire or cable machine, and 2 the improved measuring and stop mechanism which is mounted thereon.

It is to be understood that the wire or cable machine may be of any desired construction as it constitutes no part of the present invention. As a matter of fact my improved stop mechanism may be applied to any machine other than a wire or cable machine, where it is desired that the machine be automatically thrown out of gear after having run for a certain length of time.

The stop mechanism comprises an upright or approximately rectangular flat supporting plate 3 provided at its lower end with a laterally projecting base portion 4. An approximately inverted U-shaped frame 5 is arranged at one side edge and at the lower end of the supporting plate 3, said frame having a laterally projecting base portion 6 upon which rests the base portion 4 and the supporting plate 3. The upper ends of the side pieces of the frame 5 are slotted centrally and longitudinally to provide a fork 7 at the upper end of each of the side pieces, between the arms of which extends a transverse shaft 8 mounted at opposite ends in suitable boxings 9, which are mounted to slide upon the arms of the forks. A roller 10 is keyed or otherwise fixed to the shaft 8 and is caused to bear on the wire 11 which is fed to the machine through a guide 12 carried by a supporting plate 13 screwed or otherwise attached to the front edge of the side pieces of the frame 5 between the roller 10 and a similar smaller roller 14 mounted immediately below the roller 10, by means of pressure springs 15, which bear upon the boxes 9 in which the shaft 8 is mounted. The tension of these springs is regulated by adjusting screws 16 screwing through a plate 17 screwed to the upper end of the frame 5. The roller 10 is provided at one face with a laterally projecting lug 18, which is adapted at each revolution of said wheel to engage one of the fingers 19 of a wheel 20 arranged at one end of a shaft 21 journaled in suitable bearings 26 screwed or otherwise attached to the front face of the upright supporting plate 3. A beveled or miter gear 27 is fixed to the shaft 21 and is adapted to intermesh with a corresponding beveled gear 28 carried by the lower end of an upright threaded spindle 29 journaled in bearings 30 screwed to the front face of the upright supporting plate 3.

Numeral 31 indicates a slide which is caused to ascend upon the spindle by turning the latter in the proper direction. This slide comprises a suitable casing 32 Fig. 5 which carries a fixed block 33 provided in one face with a semi-circular threaded recessed portion 34 to receive the threaded portion of the spindle 29, said recessed portion of the fixed block being normally held in engaged relation with the spindle, by pressure springs 35, the inner ends of which fit in corresponding sockets in the outer face of said block and the opposite ends of which fit in corresponding sockets in the inner face of a sliding block 36, which is adapted to slide laterally within the casing and is provided on its outer face with a pair of central vertically spaced lugs 37 which fit in a corresponding central longitudinal groove 38 produced in the inner face of an upright guide 39 screwed at opposite ends to the face of the upright supporting plate 3. The slide 31 is further provided with an inwardly extending T-shaped portion 40, the body of which slides through a longitudinal slot in the supporting plate 3 and the head 41 of which slides against the rear face of said plate, the slide being adapted to engage an inwardly and laterally projecting finger 42 at the upper end of the trip 43 mounted to slide upon screws 43' screwing into the face of the plate 3. Said trip is made in two sections 44, the inner slotted ends of which are adjustably connected by screws 45. By this construction the trip may be lengthened or shortened as desired to cause the slide 31 to ascend a greater or less distance upon the spindle 29 before striking or engaging the finger 42 thereof. The lower end of the trip is connected with one arm of a bell crank 46 pivoted at the junction of its arm to the face of an upright bearing 47 mounted on the bed of the machine frame. The other arm 48 of the bell crank normally engages the inner end of a spring controller in the form of a rod 49 mounted to slide longitudinally in bearings 50 attached to the face of a support 51 projecting laterally from the bed of the machine. A catch 52 is pivoted between its ends to the face of the support 51, the inner end of said catch being normally engaged by the outer end of the controller, and the opposite end thereof projecting beyond the support, the purpose of which will be disclosed.

A rock shaft 53 is mounted near the base of the frame work 1 of the machine and is provided at one end with a vertically extending arm 54, the upper end of which normally engages the projecting portion of the catch 52. Said rock shaft is also provided with an arm 55, the outer end of which is connected to an upright pull spring 56, the upper end of which is engaged with a support 57. The tendency of this spring is to swing the arm 54 rearwardly.

The numeral 58 indicates the belt shifter which is arranged at one end of the rock shaft 53 and is provided with the usual fork 59 to receive the belt 60.

In practice the wire 11 is fed between the rollers 10 and 14, as heretofore described, causing the same to turn. The lug 18 strikes one of the fingers 19 of the wheel 20 at each revolution of the roller 10, and turns the shaft 21 a fraction of a revolution, said shaft 21 through the medium of the gears 27 and 28, also causing the spindle 29 to turn a fraction of a revolution. As the spindle 29 is intermittently turned the slide 31 is caused to gradually ascend thereon, until it reaches the finger 42 of the trip 43 and raises the latter sufficiently to effect the disengagement of the controller 49 from the inner end of the catch 52. As the catch 52 is released by the controller the arm 54 is caused to swing rearwardly by the spring 56 and the belt 60 shifted from the fast pulley to a loose pulley by the shifter 58 which is arranged at one end of the rock shaft 53, as heretofore explained. The trip 43 may be lengthened or shortened as desired to cause the slide to extend a greater or less distance before engaging the finger 42 thereof, and because of this fact the stop mechanism may be caused to throw the machine out of gear after any desired quantity of wire has been fed to the machine.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. In combination with a belt driven machine, a measuring device for wire, cable or the like, a rock shaft mounted in the machine, a forked arm at one end of the rock shaft to receive the belt, a pull string to rock the shaft in one direction, an upright arm carried by the rock shaft, means to hold said arm in substantially upright or inoperative position against the tension of said spring, and means including said measuring device operable to cause the arm holding means to release said arm when a predetermined amount of the wire or other material has been measured.

2. In combination with a belt driven machine, a measuring device for wire, cable or the like, a rock shaft journaled in the machine, a belt shifter at one end of the rock shaft, an upright spring to rock the shaft in one direction, a controller arm carried by the rock shaft, means to normally hold the controller arm in substantially upright or inoperative position against the tension of the spring, and means including said measuring device operable to automatically effect the release of the controller arm when a predetermined amount of wire or other material has been measured.

3. In combination with a belt driven machine, a measuring device for wire, cable or the like, a rock shaft journaled thereto, a belt shifter at one end of the shaft, a controller arm carried by the rock shaft, a pivoted catch to engage and hold the controller arm in inoperative position against the tension of the spring, a spring-pressed controller to normally hold the catch in engaged relation with the controller arm, and means including said measuring device operable to automatically actuate the controller arm to release said catch when a predetermined amount of the wire or other material has been measured.

4. In combination with a belt driven machine, a measuring device for wire, cable or the like, a rock shaft journaled in the machine, a belt shifter at one end of the rock shaft, a supporting plate mounted upon the body of the machine, a trip mounted to slide longitudinally of said plate, a spring-pressed controller mounted to slide upon the body of the machine, a connection between the lower end of the trip and controller, a spring to rock said shaft in one direction, an arm carried by the rock shaft, a pivoted catch engaged by the controller and adapted in turn to normally hold the arm of the rock shaft in inoperative position against the tension of said spring and means including said measuring device for automatically operating to raise the trip when a predetermined amount of wire or other material has been measured.

5. In combination with a belt driven machine, a measuring device for wire, cable or the like, a rock shaft, a pull string to rock said shaft in one direction, an arm carried by the rock shaft, a pivoted catch to normally hold said arm in inoperative position against the tension of said spring, a controller to normally engage the pivoted catch and means including said measuring device to automatically release the controller from the catch when a predetermined amount of wire or other material has been measured.

6. In combination with a belt driven machine, an upright support mounted thereon, a threaded spindle mounted to turn upon the support, a guide provided with a longitudinal groove, a slide comprising a casing provided with a fixed member formed with a threaded recess to receive the spindle and a second laterally slidable member provided with lugs to enter the groove of said guide and separated from the fixed member by springs, means for intermittently turning the spindle, and means operable to shift the belt after the slide has moved a predetermined distance upon the spindle.

7. In combination with a belt driven machine, a supporting plate mounted thereon, a threaded spindle journaled in front of the plate, a slide comprising a casing provided with an inwardly extending portion to bear against the face of the supporting plate, a fixed block within the casing provided with a screw-threaded recess to receive the spindle and a laterally movable member provided with lugs movable laterally through one side of the casing and held in spaced relation with the fixed member by springs, a guide provided with a longitudinal groove to receive the lugs of the movable member of the slide arranged longitudinally of the supporting plate, means for intermittently turning the spindle to cause the slide to ascend thereon and means operated by said slide to shift the belt after the slide has ascended a predetermined distance upon the spindle.

8. In combination with a belt driven machine, an upright supporting plate, a spindle journaled to the face of the said plate, a slide to receive the spindle, a pair of friction rollers mounted near the lower end of the supporting plate, means for intermittently turning the spindle by passing a piece of wire between the rollers, an upright longitudinally movable adjustable trip having a portion disposed in the path of the slide, a belt shifter for shifting the belt of said machine and connections between the trip and the belt shifter for operating the latter by a predetermined movement of the former.

9. In combination with a belt driven machine, a support mounted thereon, a pair of vertically spaced rollers mounted near the lower end of the support, a threaded spindle journaled to the face of the support, a slide having a screw thread to receive the spindle and an inwardly extending portion to slide against the face of said support, an upright longitudinally movable trip having a portion disposed in the path of the slide, means for intermittently turning the spindle by passing a piece of wire between the rollers to cause the slide to ascend upon the spindle to actuate the trip, a belt shifter for shifting the belt of said machine, and connections between the trip and belt shifter to shift the latter when the former is actuated.

10. In combination with a belt driven machine, a support mounted thereon, a vertically movable spring-pressed roller mounted near the lower end of the support, a second roller mounted beneath the movable roller, a threaded spindle mounted on the face of the support, a slide having a screw thread to receive the spindle, means for intermittently turning the spindle by passing a piece of wire between the rollers, an upright longitudinally movable trip mounted on the face of the support, said trip having a laterally projecting portion disposed in the path of the slide, a belt shifter for shifting the belt of said machine and connections between the trip and the belt shifter of the machine to shift the latter by actuating the former.

11. In combination with a belt driven machine, and an upright support mounted thereon, an upright threaded spindle mounted on the face of the support, a roller mounted near the lower end of the support, a slide having a screw thread to receive the spindle, an upright longitudinally movable trip mounted upon the face of the support, said trip having a laterally projecting portion disposed in the path of the slide, means for intermittently turning the spindle to cause the slide to engage the laterally projecting portion of the trip by turning said roller, a belt shifter for shifting the belt of said machine and connections between the lower end of the slide and the belt shifter of the machine to shift the latter by raising the former.

12. In combination with a belt driven machine, an upright support mounted thereon, an upright threaded spindle mounted at the face of the support, a slide having a screw thread to receive the spindle, a beveled gear arranged at the lower end of the spindle, a shaft mounted upon the face of the support immediately below said gear, a second beveled gear thereon to intermesh with said first mentioned gear, a wheel provided with a series of radially projecting fingers arranged at one end of said shaft, a roller having a lug to engage one of the fingers at each revolution of the roller, an upright longitudinally movable trip mounted upon the face of the support and having a laterally projecting portion disposed in the path of the slide, a belt shifter for shifting the belt of said machine and connections between the lower end of the trip and the belt shifter for shifting the latter when the former is actuated.

In testimony whereof I have hereunto set my hand in presence of two subscribing witnesses.

ISAAC ANDREW RYAN.

Witnesses:
  J. J. WILLIAMS,
  D. C. JONES.